United States Patent
Durling

(10) Patent No.: US 9,951,809 B2
(45) Date of Patent: Apr. 24, 2018

(54) ROLLING-ELEMENT BEARING AND METHOD OF COUNTERING LOAD APPLIED TO ROLLING-ELEMENT BEARING

(71) Applicant: ROLLS-ROYCE plc, London (GB)

(72) Inventor: Christopher J. Durling, Bristol (GB)

(73) Assignee: ROLLS-ROYCE plc, London (GB)

( * ) Notice: Subject to any disclaimer, the term of this patent is extended or adjusted under 35 U.S.C. 154(b) by 115 days.

(21) Appl. No.: 14/989,207

(22) Filed: Jan. 6, 2016

(65) Prior Publication Data
US 2016/0208850 A1 Jul. 21, 2016

(30) Foreign Application Priority Data
Jan. 16, 2015 (GB) .................................. 1500700.8

(51) Int. Cl.
*F16C 19/52* (2006.01)
*F16C 33/66* (2006.01)
(Continued)

(52) U.S. Cl.
CPC ............ *F16C 19/522* (2013.01); *F16C 21/00* (2013.01); *F16C 32/064* (2013.01);
(Continued)

(58) Field of Classification Search
CPC ........ F16C 39/04; F16C 32/064; F16C 21/00; F16C 33/66; F16C 33/6637;
(Continued)

(56) References Cited

U.S. PATENT DOCUMENTS 3,164,420 A * 1/1965 Cramer, Jr. ......... B01F 7/00816
277/350
3,301,611 A * 1/1967 Dunlap ................... F16C 21/00
384/13
(Continued)

FOREIGN PATENT DOCUMENTS

DE 29620323 U1 * 1/1997
DE 10 2008 032 922 A1 1/2010
(Continued)

OTHER PUBLICATIONS

Jun. 24, 2015 Search Report issued in British Patent Application No. 1500700.8.
(Continued)

*Primary Examiner* — Alan B Waits
(74) *Attorney, Agent, or Firm* — Oliff PLC

(57) ABSTRACT

A rolling-element bearing includes an inner bearing ring and an outer bearing ring. The inner bearing ring and the outer bearing ring define an axial direction and a circumferential direction. The rolling-element bearing includes a plurality of rolling elements. The rolling elements are configured to roll circumferentially between the inner bearing ring and the outer bearing ring. The rolling-element bearing includes at least one oil chamber. The oil chamber is between the inner bearing ring and the outer bearing ring. Each oil chamber is defined by the inner bearing ring, the outer bearing ring and an oil chamber housing. The oil chamber housing is fixed to one of the inner bearing ring and the outer bearing ring. The rolling-element bearing includes at least one duct corresponding to each oil chamber. The at least one duct is for a supply of oil to the corresponding oil chamber. Each duct extends through the bearing ring to which the oil chamber housing is fixed.

14 Claims, 9 Drawing Sheets

(51) Int. Cl.
*F16C 39/04* (2006.01)
*F16C 21/00* (2006.01)
*F16C 32/06* (2006.01)
*F16C 19/28* (2006.01)

(52) U.S. Cl.
CPC .......... *F16C 32/0685* (2013.01); *F16C 39/04* (2013.01); *F16C 19/28* (2013.01); *F16C 33/6651* (2013.01); *F16C 33/6677* (2013.01); *F16C 2361/61* (2013.01)

(58) Field of Classification Search
CPC .............. F16C 33/6659; F16C 33/6662; F16C 33/6674; F16C 33/6677; F16C 33/6651
See application file for complete search history.

(56) References Cited

U.S. PATENT DOCUMENTS

| | | | | |
|---|---|---|---|---|
| 3,305,280 A * | 2/1967 | Peterson | ................ | F16C 21/00 384/126 |
| 3,408,123 A * | 10/1968 | Zwicky | ............... | F16C 33/6659 384/114 |
| 3,854,781 A * | 12/1974 | Bildtsen | ................. | F16C 17/20 384/102 |
| 4,000,559 A * | 1/1977 | Korrenn | ................. | F16C 21/00 384/101 |
| 4,605,317 A * | 8/1986 | Bonaccorso | ............ | F16C 19/26 384/101 |
| 4,927,274 A * | 5/1990 | Smith | ................. | F16C 32/0688 384/101 |
| 5,348,401 A * | 9/1994 | Justak | .................... | F16C 21/00 384/101 |
| 6,120,186 A * | 9/2000 | Snellman | .............. | F16C 33/102 384/151 |
| 6,966,191 B2 * | 11/2005 | Fukutani | .................. | F01D 3/02 60/39.08 |
| 8,016,554 B2 * | 9/2011 | Ward | ...................... | F01D 25/16 415/175 |
| 8,740,494 B2 * | 6/2014 | Durling | ................. | F16B 7/0413 403/16 |
| 2009/0078075 A1 | 3/2009 | Vassaux | | |
| 2016/0201793 A1* | 7/2016 | Muldoon | .................. | F16H 1/28 475/159 |
| 2016/0258488 A1* | 9/2016 | Lin | ....................... | F16C 35/063 |

FOREIGN PATENT DOCUMENTS

| | | |
|---|---|---|
| EP | 0 807 763 A1 | 11/1997 |
| EP | 2 835 546 A2 | 2/2015 |
| JP | 2008-106900 A | 5/2008 |
| JP | 2008240896 A | 10/2008 |
| JP | 2009-047265 A | 3/2009 |
| WO | 2006/064858 A1 | 6/2006 |
| WO | 2015/070141 A1 | 5/2015 |

OTHER PUBLICATIONS

Jun. 17, 2016 Search Report issued in British Patent Application No. 1600213.1.

* cited by examiner

ROLLING-ELEMENT BEARING AND METHOD OF COUNTERING LOAD APPLIED TO ROLLING-ELEMENT BEARING

The present disclosure relates to a rolling-element bearing and a method of countering a load applied to a rolling-element bearing. More particularly, the rolling-element bearing may be for a mechanism included in a device such as, by way of example and not by way of limitation, a geared fan of a turbo fan aero engine.

A rolling-element bearing (sometimes called a roller bearing) might be used to support a rotating component such as a gear. The lifetime of a rolling-element bearing depends on various factors or parameters such as the load to be carried, the rotation speed, and the working temperature, etc. Rolling-element bearings can come in different sizes. The size of the rolling-element bearing can affect the lifetime of the rolling-element bearing. Hence, a rolling-element bearing can be sized to give a predicted lifetime.

In high duty environments, it can be difficult to design a rolling-element bearing that has an adequate lifetime as well as acceptable physical dimensions. Increasing the size of a rolling-element bearing may typically reduce the load on particular parts of the rolling-element bearing. However, increasing the size of a rolling-element bearing does not always result in lower loads because of other factors such as centrifugal loading. This is particularly the case when the rolling-element bearing is part of a gear set such as a planetary epicyclic gear set. Factors such as centrifugal loading can reduce or even cancel the benefits of increasing the size of the rolling-element bearing. Furthermore, the rolling-element bearing should be designed to have an acceptable size and weight.

Within a given size range, the load capacity of a rolling-element bearing may be increased by employing extra rows (sometimes called sets) of rolling elements (e.g. rollers). However, increasing the number of rolling elements presents its own problems such as increased weight, cost and oil supply requirements. Furthermore, increasing the number of rollers used may still not give the required off-load (i.e. the amount by which a load on particular parts of the rolling-element bearing is reduced).

Accordingly, it is desirable to provide a rolling-element bearing with an increased lifetime for a given size and weight.

According to an aspect, there is provided a rolling-element bearing comprising an inner bearing ring and an outer bearing ring. The inner bearing ring and the outer bearing ring define an axial direction and a circumferential direction. The rolling-element bearing comprises a plurality of rolling elements. The rolling elements are configured to roll circumferentially between the inner bearing ring and the outer bearing ring. The rolling-element bearing comprises at least one oil chamber. The oil chamber is between the inner bearing ring and the outer bearing ring. Each oil chamber is defined by the inner bearing ring, the outer bearing ring and an oil chamber housing. The oil chamber housing is fixed to one of the inner bearing ring and the outer bearing ring. The rolling-element bearing comprises at least one duct corresponding to each oil chamber. The at least one duct is for a supply of oil to the corresponding oil chamber. Each duct may extend through the bearing ring to which the oil chamber housing is fixed.

Accordingly, the lifetime of the rolling-element bearing is increased. In particular, by providing the oil chamber, oil supplied to the oil chamber acts directly against a load applied to the rolling-element bearing. For example, if the oil chamber housing is fixed to the inner bearing ring, then the oil acts directly against the inner surface of the outer bearing ring, thereby opposing a load applied radially inwards on the outer surface of the outer bearing ring. This reduces the resultant effective load applied to particular parts of the rolling-element bearing, such as the rolling elements. This improves the load capacity of the rolling-element bearing and increases its lifetime.

Furthermore, for a given load offset, the rolling-element bearing can be lighter compared to conventional rolling-element bearings in the prior art. Additionally, the rolling-element bearing is more tolerant of failure. This means that a failure such as a sudden reduction of the oil pressure would not lead to an immediate failure of the rolling-element bearing. Instead, the oil chamber would fail to offset the load, which would reduce the lifetime of the rolling-element bearing, but not prevent the roling-element bearing from functioning.

The at least one oil chamber may be spaced from or adjacent to the rolling elements in the axial direction.

The rolling-element bearing may comprise two axially spaced sets of rolling elements, wherein each oil chamber is axially between the two sets of rolling elements.

Each oil chamber may extend circumferentially between the inner bearing ring and the outer bearing ring over an arc of less than 180°. The arc may be at least 110°.

Each oil chamber may be accommodated adjacent to the bearing ring to which it is not fixed with so narrow a clearance that the oil chamber is a self-sealed space.

The oil chamber housing comprises at least one hole for supplying oil from the oil chamber to the rolling elements.

The rolling-element bearing may comprising a plurality of oil chambers spaced from each other in the axial direction. Each of a plurality of axially spaced oil chambers may extend circumferentially between the inner bearing ring and the outer bearing ring over the same arc. The rolling-element bearing may comprise two axially spaced sets of rolling elements and three axially spaced sets of oil chambers, wherein one of the sets of oil chambers is axially between the two sets of rolling elements and each set of rolling elements is axially between two of the sets of oil chambers.

The rolling-element bearing may comprise a plurality of oil chambers that extend circumferentially between the inner bearing ring and the outer bearing ring over non-overlapping arcs.

According to an aspect, there is provided a mechanism comprising: the rolling-element bearing of any preceding claim; and a rotating object integral with, or in an interference fit with, the bearing ring to which the oil chamber is not fixed.

The mechanism may comprise a load applying component that applies a load on the rolling-element bearing in a load direction, which is radial with respect to the rolling-element bearing, wherein at least one oil chamber is between the applied load and the bearing ring to which it is fixed, such that oil supplied to the oil chamber acts on the bearing ring to which the oil chamber is not fixed so as to oppose the applied load.

The mechanism may comprise an oil supply system configured to supply oil through the at least one duct to the corresponding oil chamber.

The mechanism may be arranged such that the supply of oil for at least one of the oil chambers is controllable independently from the supply of oil for at least one other of the oil chambers.

According to an aspect, there is provided a method of countering a load applied to the rolling-element bearing. The method may comprise supplying oil to the at least one oil chamber, such that oil supplied to the at least one oil chamber acts on the bearing ring to which the oil chamber is not fixed so as to oppose the applied load.

According to an aspect, there is provided a rolling-element bearing substantially as described herein and/or with reference to the accompanying drawings.

According to an aspect, there is provided a method of countering a load applied to a rolling-element bearing substantially as described herein and/or with reference to the accompanying drawings.

Embodiments of the invention will now be described by way of non-limitative examples with reference to the accompanying drawings in which.

Figure 1:
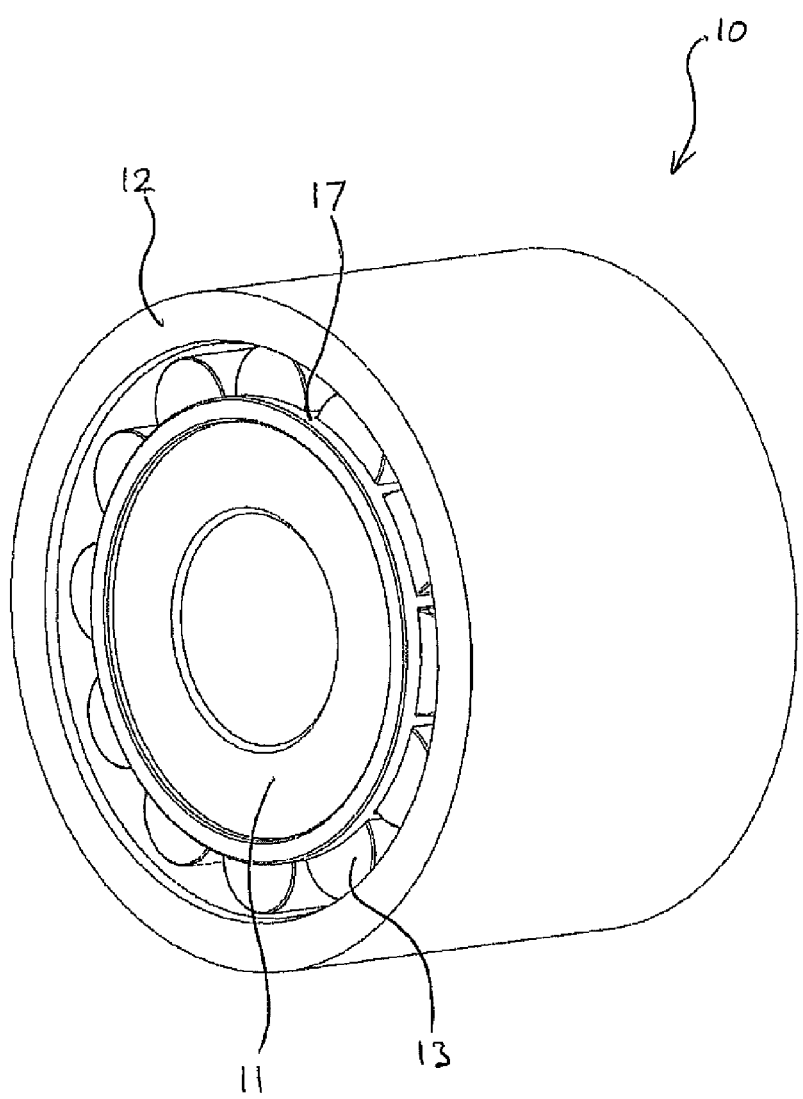
FIG. 1 shows a rolling-element bearing.
Figure 7:
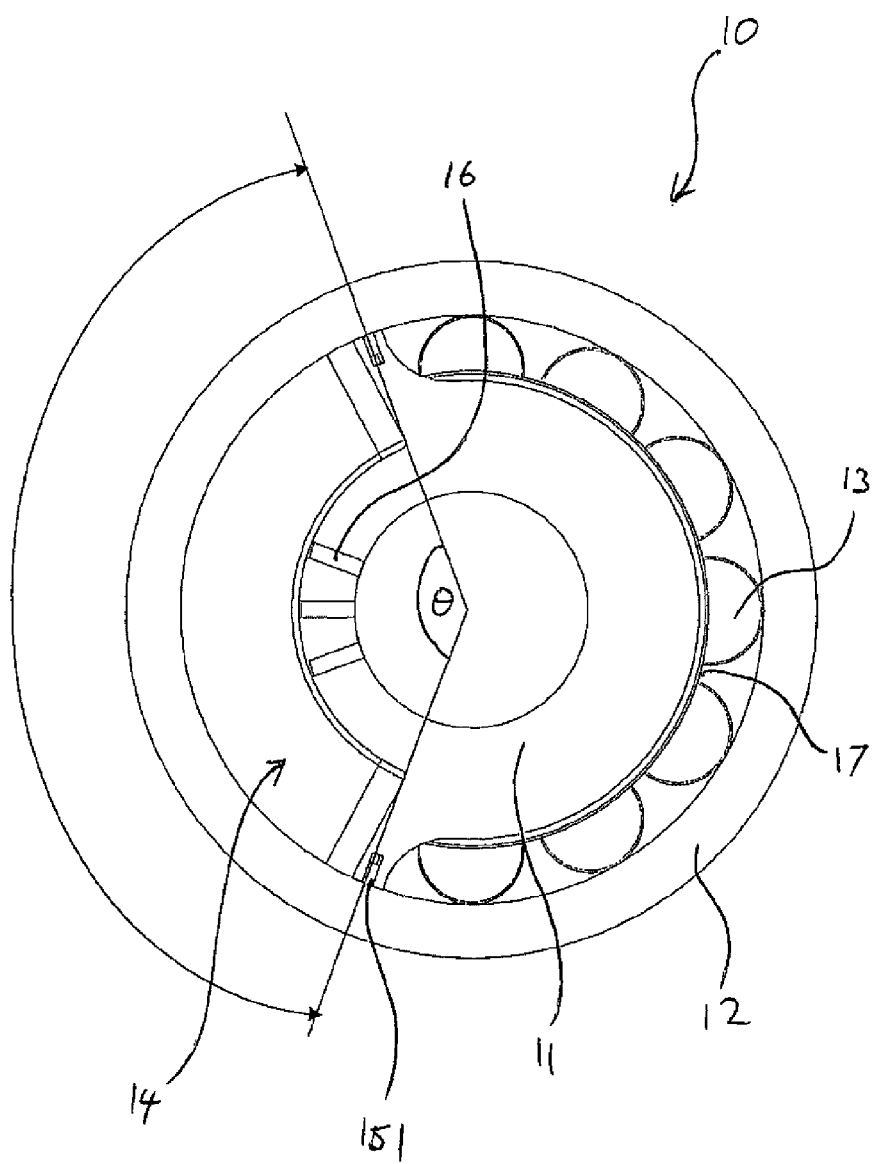
FIG. 7 shows the axial section of FIG. 6 shown from a different angle.

With reference to FIG. 1, a rolling-element bearing generally indicated at 10 comprises an inner bearing ring 11 (sometimes called an inner race) and an outer bearing ring 12 (sometimes called an outer race). The inner bearing ring 11 and the outer bearing ring 12 define an axial direction and a circumferential direction. The axial direction extends through the middle of the inner bearing ring 11 and the outer bearing ring 12. In FIG. 7, the axial direction is the direction extending into and out of the paper in the centre of the rolling-element bearing 10.

The rolling-element bearing 10 further comprises a plurality of rolling elements 13. The rolling elements 13 are configured to roll circumferentially between the inner bearing ring 11 and the outer bearing ring 12. The rolling elements 13 may be rollers or balls. In the Figures, the rolling elements 13 are rollers, which may be substantially cylindrical. The rolling elements 13 may be accommodated in a roller cage 17, as shown in FIG. 1. The roller cage 17 may help to keep the rolling elements 13 evenly and accurately positioned.

Although not shown in the Figures, the rolling elements 13 may be balls. Balls have a small elliptical contact with the inner surface of the outer bearing ring 12 and with the outer surface of the inner bearing ring 11. The relatively small contact area provides relatively low friction and smooth running characteristics.

As shown in the Figures, the rolling elements 13 may be rollers. Rollers have larger contact areas, which is better for heavy loads and shock loads, for example.

Figure 8:
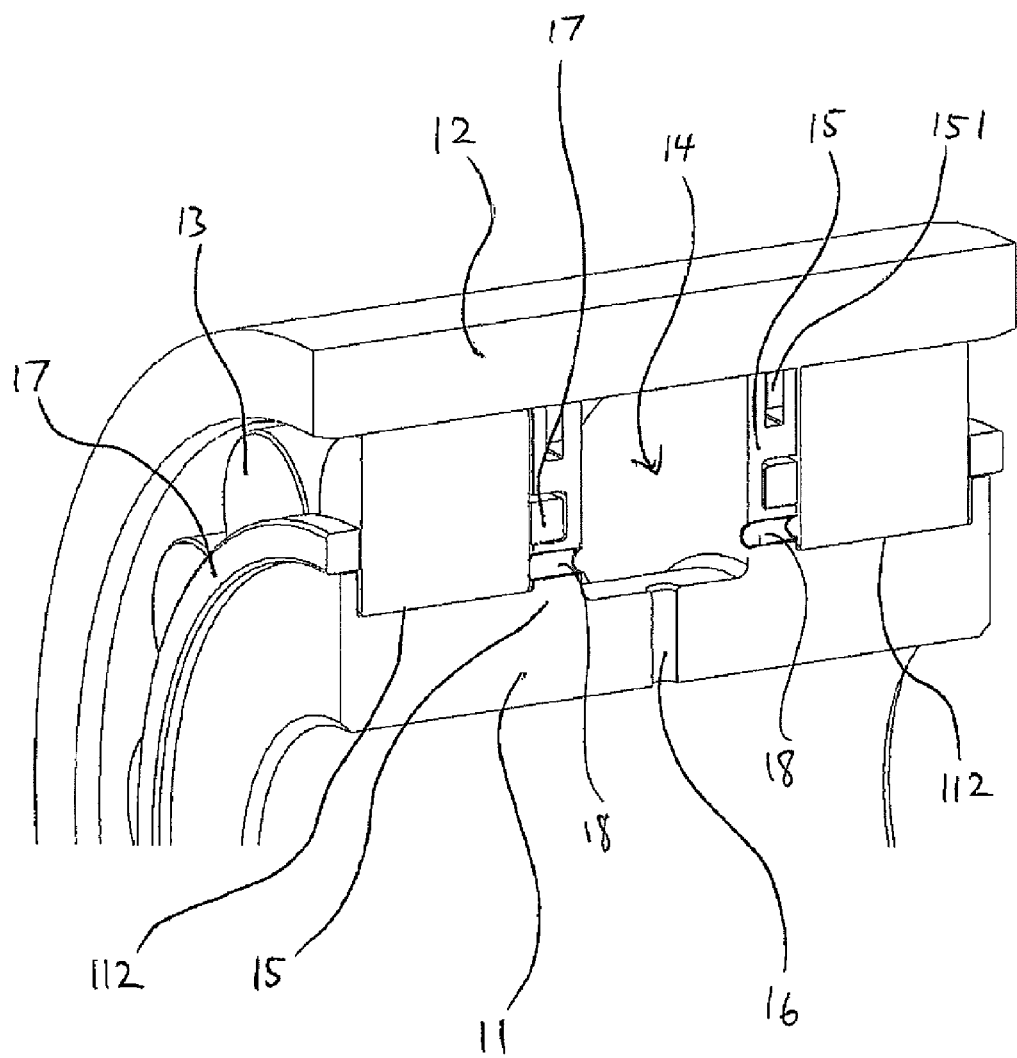
FIG. 8 shows a radial section of the rolling-element bearing of FIG. 1.

The inner bearing ring 11 and/or the outer bearing ring 12 may have a groove for accommodating the rolling elements 13. A groove helps the rolling-element bearing 10 to bear axial loads in addition to radial loads. The inner bearing ring 11 and the outer bearing ring 12 may not have such a groove. FIG. 8 shows a construction in which the inner bearing ring 11 has a groove 112 for accommodating the rolling elements 13. FIG. 8 also shows that the outer bearing ring 12 does not have any groove.

The rolling-element bearing 10 may comprise a single row of rolling elements 13. For example, a rolling-element bearing 10 comprising a single row of balls as the rolling elements 13 may be suitable for use in devices such as a small electric motor, electrical appliances and light gearboxes.

The rolling-element bearing 10 may comprise multiple rows of rolling elements 13. For example, as shown in the Figures, the rolling-element bearing 10 may comprise two rows 131, 132 of rolling elements 13. The rolling elements 13 in one row 131 may be misaligned with the rolling elements 13 in the other row 132. Alternatively, as shown in the Figures, the rolling elements 13 in the rows 131, 132 may be aligned with each other.

The rolling-element bearing 10 may be tapered in the axial direction. For example, the rolling-element bearing 10 may be tapered in the axial direction and comprise a single row of rollers as the rolling element 13. Such a rolling-element bearing 10 combines radial and axial loads in one direction only. In another example, the rolling-element bearing 10 is a so-called spherical roller bearing comprising two rows 131, 132 of rollers as the rolling elements 13. Each half of the bearing corresponds to one row of rollers. Each half tapers in the axial direction such that each roller is closer to the axis at the axial ends of the bearing compared to in the middle of the bearing. Such a spherical roller bearing combines radial and axial loads in either direction.

The size of the rolling-element bearing 10 is not particularly limited. The rolling-element bearing may be a tiny, high precision rolling-element bearing 10, which would be suitable for use in applications such as cameras and office equipment.

Alternatively, the rolling-element bearing 10 may be larger, suitable for more rugged and hostile environments. For example, the rolling-element bearing 10 may have a diameter in the range of from about 100 mm to about 220 mm. The rolling-element bearing 10 may have a diameter of about 150 mm. The rolling-element bearing 10 may have an axial length in the range of from about 100 mm to about 220 mm. The rolling-element bearing 10 may have an axial length of about 150 mm.

Figure 2:
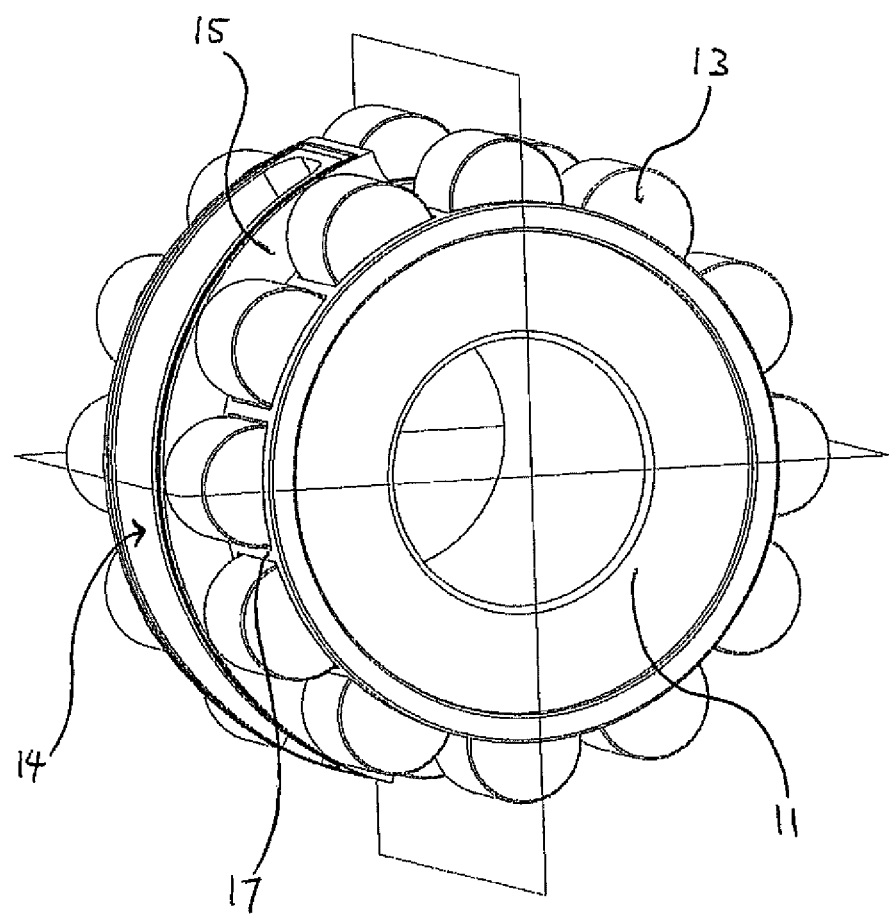
FIG. 2 shows the rolling-element bearing of FIG. 1 without the outer bearing ring.
Figure 3:
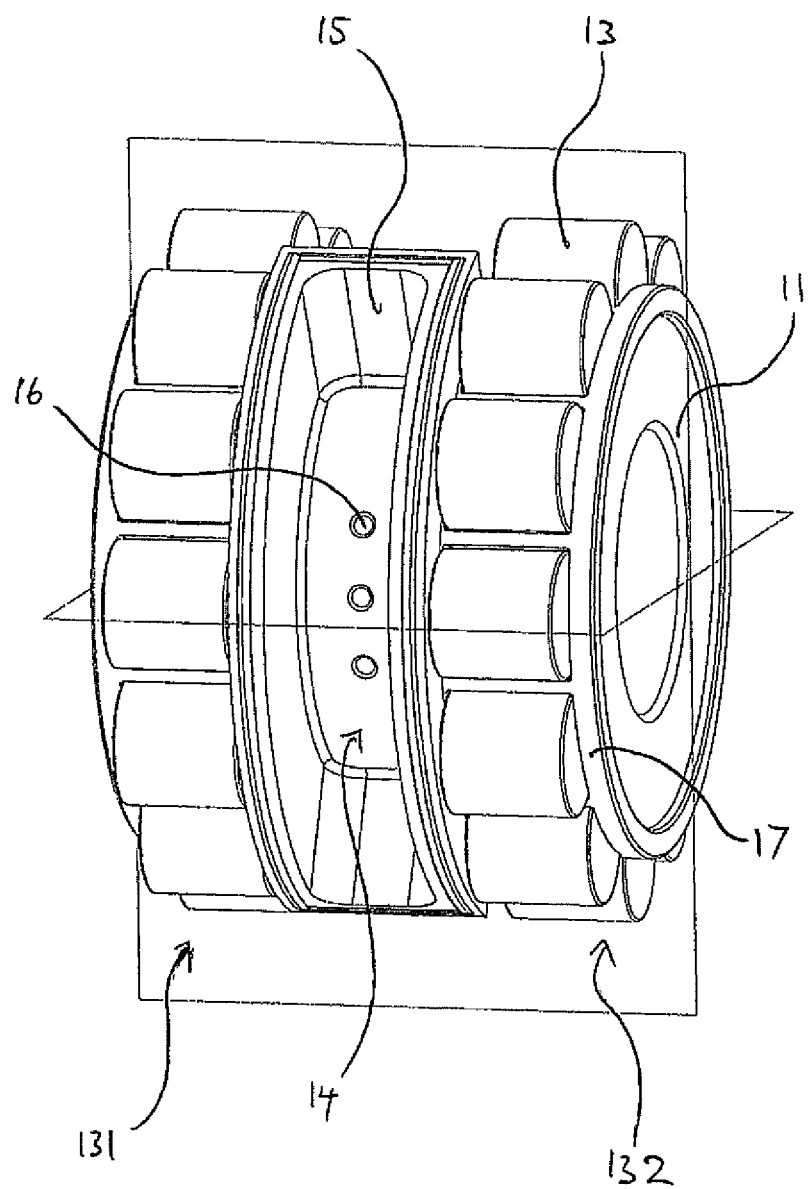
FIG. 3 shows the rolling-element bearing of FIG. 2 from a different angle.

As shown in FIGS. 2 and 3, the rolling-element bearing 10 may comprise at least one oil chamber 14. The oil chamber 14 is between the inner bearing ring 11 and the outer bearing ring 12.

The oil chamber 14 is a space or a volume in which oil may be held or accommodated. The oil chamber 14 may be defined by the inner bearing ring 11, the outer bearing ring 12 and an oil chamber housing 15. The oil chamber 14 is substantially enclosed by walls. The wall that is most radially inward (with respect to the rolling-element bearing 10) is provided by part of the outer surface of the inner bearing ring 11. The wall that is most radially outward is provided by part of the inner surface of the outer bearing ring 12. The side walls of the oil chamber 14 are provided by the oil chamber housing 15.

The oil chamber housing 15 may be fixed to one of the inner bearing ring 11 and the outer bearing ring 12. In FIGS. 2 and 3, the oil chamber housing 15 is shown as being fixed to the inner bearing ring 11. The oil chamber housing 15 may be formed integrally with the inner bearing ring 11 as shown in FIG. 8, or may be formed as a separate component that is subsequently fixed to the inner bearing ring 11 during manufacture. The oil chamber housing 15 can move relative to the bearing ring that it is not fixed to. For example, in the construction depicted in the Figures, the oil chamber housing 15 can move relative to the outer bearing ring 12. Accordingly, a clearance may be provided between the oil chamber housing 15 and the inner surface of the outer bearing ring 12.

The rolling-element bearing 10 may comprise at least one duct 16 corresponding to each oil chamber 14. For example, FIG. 3 shows three ducts 16 corresponding to the single oil chamber 14. The ducts 16 are for a supply of oil to the oil chamber 14. Each duct 16 extends through the bearing ring to which the oil chamber housing 15 is fixed. For example, as depicted in FIG. 3, when the oil chamber housing 15 is fixed to the inner bearing ring 11, each duct 16 extends through the inner bearing ring 11. The number and arrangement of ducts 16 provided for each oil chamber 14 is not particularly limited. For example, the number of ducts 16 may be one, two, three, four or more.

Figure 10:
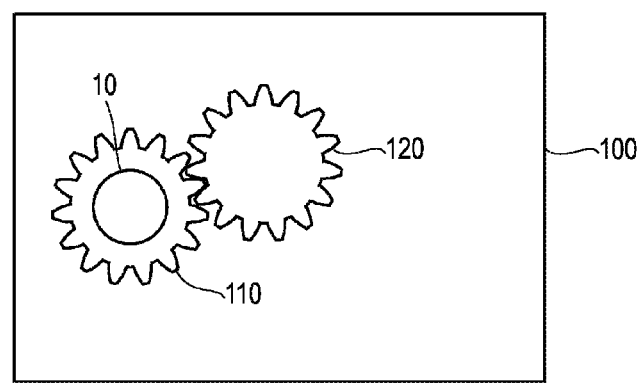
FIG. 10 shows a schematic illustration of a gas turbine engine including the rolling-element bearing of FIG. 1.

In the construction depicted in the Figures, and as shown in FIG. 10, the outer bearing ring 12 may be integral with a rotating object 110, or may be in an interference fit with the rotating object 110. The rotating object 110 may be, for example, a gear. The inner bearing ring 11 may not rotate in use. However, the roles of the inner bearing ring 11 and the outer bearing ring 12 may be reversed in some applications. For example, the inner bearing ring 11 may be integral with, or in an interference fit with, the rotating object, and the outer bearing ring 12 may not rotate in use.

Figure 4:
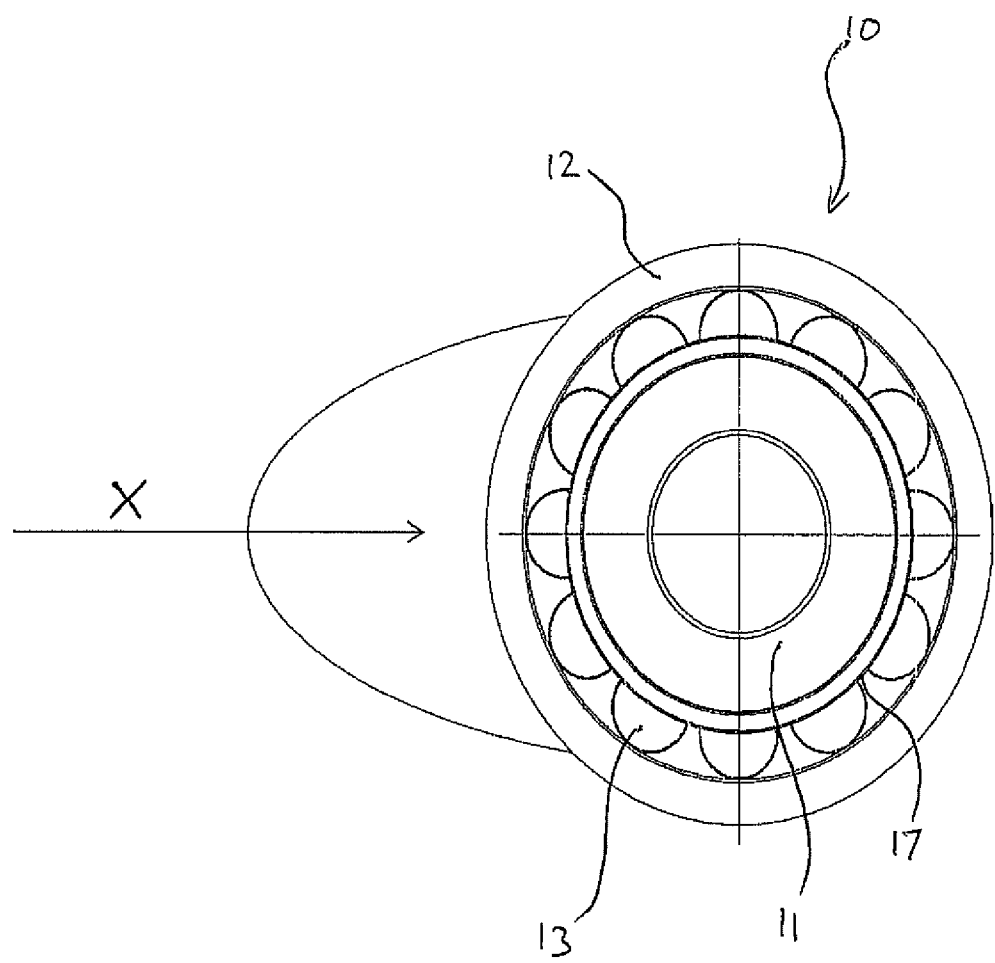
FIG. 4 shows the distribution of a load applied to the rolling-element bearing of FIG. 1.

In use, a load is applied to the rolling-element bearing 10. The direction and distribution of such an applied load is shown in FIG. 4. The direction of the applied load, namely the load direction X is shown by the arrow in FIG. 4. The distribution of the applied load is shown by the curved line external to the rolling-element bearing 10. As shown in FIG. 4, the load may be greatest along a plane that passes through the centre of the rolling-element bearing 10.

As shown in FIG. 4, the load direction X may be radial with respect to the rolling-element bearing 10. The direction of applied load may not be precisely radial. For example, the direction of applied load may be angled or oblique relative to the radial direction, but may include a radial element. In use of the rolling-element bearing 10, the applied load can limit the lifetime of the rolling-element bearing 10. In particular, as shown in FIG. 4, the applied load is distributed such that it is greatest at a particular position of the rolling-element bearing 10. This can cause the section of the rolling-element bearing 10 that is under the highest load to fail, thereby ending the life of the rolling-element bearing 10.

In use of the rolling-element bearing 10 described above, a fluid such as oil is supplied to the oil chamber 14. The oil, which may be pressurised, acts directly on the inner surface (which may be called the inner diameter) of the outer bearing ring 12. The oil exerts a pressure on the inner surface of the outer bearing ring 12. The pressure exerted on the inner surface of the outer bearing ring 12 acts in a direction opposite to the load direction X.

Figure 5:
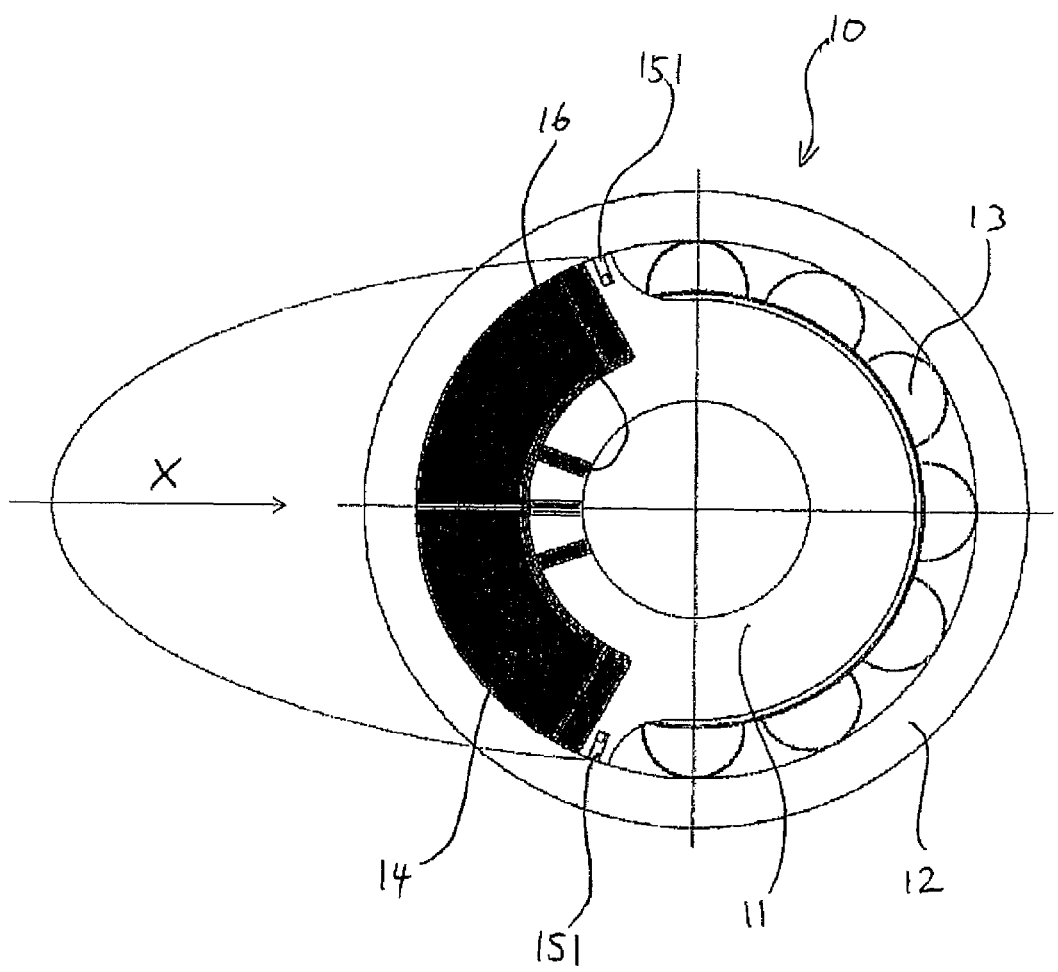
FIG. 5 shows the oil pressure distribution opposing the applied load.

The distribution of the pressure exerted by the oil is distributed as shown in FIG. 5. The pressure exerted by the oil counters the applied load. In FIG. 5, the distribution of the pressure exerted by the oil in the inner surface of the outer bearing ring 12 is shown by the curved line that is mainly external to the rolling-element bearing 10. As shown in FIG. 5, the pressure distribution resulting from the oil in the oil chamber 14 may closely follow in form the pressure distribution of the applied load. This can be seen from a comparison between FIG. 4 and FIG. 5.

The pressure curve generated by the pressurised oil in the oil chamber 14 relates to a particular radial direction. In the construction depicted in the Figures, the pressure curve generated by the pressurised oil in the oil chamber 14 relates to the radial direction opposite to the applied radial load in load direction X. The pressure curve generated by the pressurised oil in the oil chamber 14 acts purely radially over the entire span of the oil chamber 14.

Accordingly, the pressure exerted by the oil reduces the resultant load experienced by the rolling-element bearing 10, and in particular by the rolling elements 13. This allows the rolling-element bearing 10 to be used for longer because the overall load on the rolling elements 13 during use is reduced.

The oil chamber 14 may extend between the inner bearing ring 11 and the outer bearing ring 12 such that oil supplied to the oil chamber 14 acts hydrostatically on the bearing ring to which the oil chamber 14 is not affixed. For example, the oil chamber housing 15 may be accommodated adjacent to the outer bearing ring 12 (i.e. the bearing ring to which it is not fixed) with so narrow a clearance that the oil chamber 14 is a substantially self-sealed space.

Of course, the oil chamber 14 cannot be completely sealed because some clearance between the oil chamber housing 15 and the outer bearing ring 12 is required so that the oil chamber housing 15 and the outer bearing ring 12 can rotate relative to each other. However, the clearance may be as narrow as possible, such that when oil is supplied into the oil chamber 14, substantially no oil flows through the gap that is the clearance between the oil chamber housing 15 and the outer bearing ring 12. This allows the oil to act on the inner surface of the outer bearing ring 12 hydrostatically, rather than hydrodynamically.

By providing the oil chamber 14 between the inner bearing ring 11 and the outer bearing ring 12, a load applied to the rolling-element bearing 10 can be at least partially off-loaded. As an example of the off-loading possibilities, for a rolling-element bearing 10 having a diameter in the region of 150 mm, an axial length in the region of 150 mm and an oil supply pressurised at about $3.5 \times 10^6$ Pa, approximately 5,200 kg can be off-loaded from the rolling elements 13 in the direction opposite to the load direction X.

The oil pressure is not particularly limited. However, the oil pressure may typically be in the region of from about $1.4 \times 10^6$ Pa to about $2.8 \times 10^7$ Pa. Assuming that the oil chamber 14 is effectively sealed, the flow requirement from an oil pump may be relatively small.

By providing that the oil chamber housing 15 is fixed to the inner bearing ring 11 (or alternatively to the outer bearing ring 12), the oil chamber 14 can be used to apply pressure in a fixed direction (i.e. opposite to the load direction X) when the rolling-element bearing 10 is being used. If the oil chamber housing 15 were not fixed to either bearing ring, then the position of the oil chamber 14 relative to the load direction X would vary, such that the oil chamber 14 would be able to apply oil pressure in the correction direction only some of the time.

By providing the oil chamber 14 for the specific purpose of applying the counter-pressure to the applied load, oil supplied to the oil chamber 14 can be controlled, e.g. such that it is confined to the oil chamber 14 and does not undesirably reach other sections of the rolling-element bearing 10, such as the regions in and around the rolling elements 13.

The at least one oil chamber 14 may be spaced from or adjacent to the rolling elements 13 in the axial direction. For example, FIGS. 2 and 3 show that the oil chamber 14 has a different axial position from the rows 131, 132 of rolling elements 13. This allows the rolling elements 13 to roll circumferentially between the inner bearing ring 11 and the outer bearing ring 12, while the oil chamber 14 has a fixed position relative to the inner bearing ring 11 (or alternatively to the outer bearing ring 12). This means that in order to apply the oil counter-pressure, oil may be supplied only to the oil chamber 14, and not to other sections of the rolling-element bearing 10.

As depicted in the Figures, the rolling-element bearing 10 may comprise two axially spaced rows 131, 132 of rolling elements 13. The rolling-element bearing 10 may be called a double row rolling-element bearing. The oil chamber 14 is axially between the two rows 131, 132 of rolling elements 13. The oil chamber 14 may be disposed symmetrically between the two rows 131, 132 of rollers (or any other type of rolling element 13). The oil chamber 14 can be supplied, and possibly filled, with oil, which may be at high pressure.

By providing the oil chamber 14, the load capacity of the rolling-element bearing 10 can be increased, without employing extra rows (e.g. four rows in total) of rollers. For a given required lifetime of the rolling-element bearing 10, the weight and cost of the rolling-element bearing 10 is reduced.

The rolling-element bearing 10 may comprise only one single row of rolling-elements 13, or may comprise more than two axially spaced rows of rolling elements 13. For example, the rolling-element bearing may comprise three or four rows of rolling elements 13. The oil chamber 14 (or plural oil chambers 14) takes up a different axial position from the rows of rolling-elements 13. This allows the rolling-elements 13 to roll circumferentially between the inner bearing ring 11 and the outer bearing ring 12, while the oil chamber 14 retains a fixed position relative to the inner bearing ring 11 (or alternatively the outer bearing ring 12).

Figure 6:
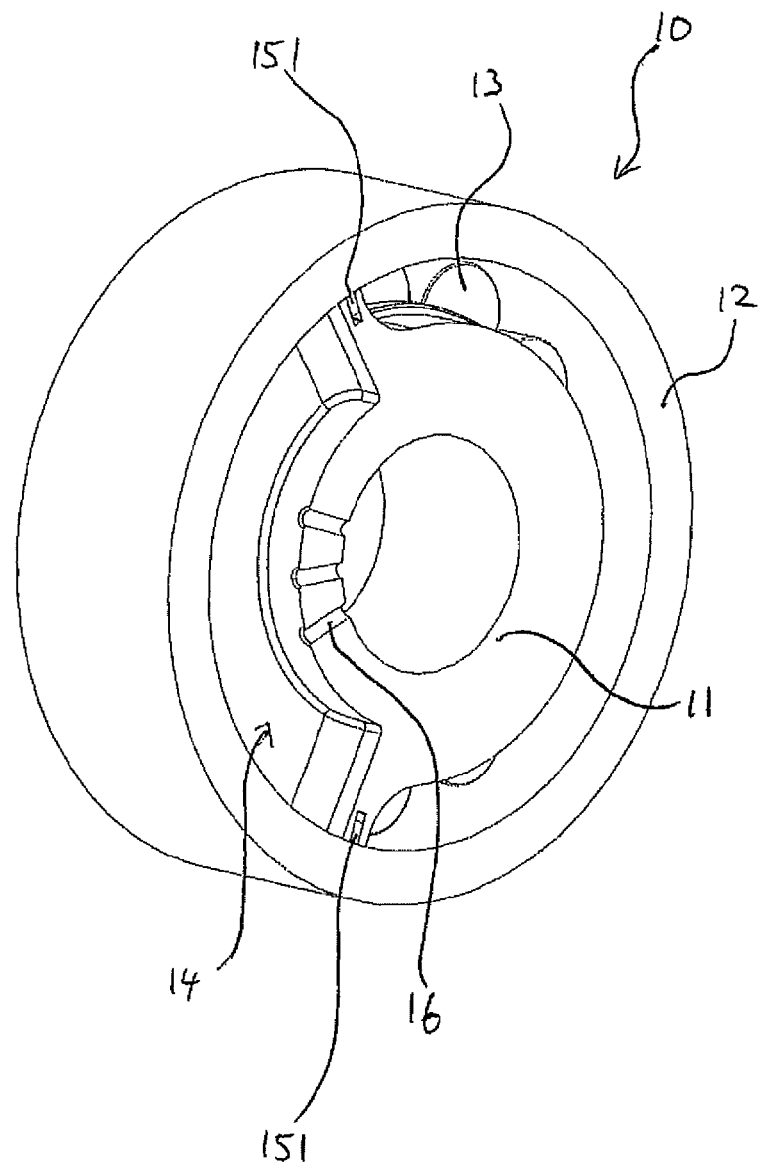
FIG. 6 shows an axial section of the rolling-element bearing of FIG. 1.

FIGS. 6 and 7 show an axial section of the rolling-element bearing 10. As shown most clearly in FIG. 7, the oil chamber 14 may extend circumferentially between the inner bearing ring 11 and the outer bearing ring 12 over an arc subtending an angle θ of less than 180°. The orientation of the oil chamber 14 and the arc over which it extends may be chosen to increase or maximise the pressure distribution in the direction opposite to the load direction X. The off-load provided by the oil pressure from the oil chamber 14 is more useful if the angle of the arc is less than 180°.

The angle θ subtended by the arc over which the oil chamber 14 extends is not particularly limited. The angle may be at least 110°. The arc may be about 140°. This can provide a working area of about 70° either side of the load direction X. The arc of the working area may be symmetrical with respect to the load direction X. This helps the distribution of the oil pressure in the oil chamber 14 to match more closely the distribution of the load applied in the load direction X.

As mentioned above, and as shown in the Figures, the oil chamber housing 15 may be accommodated adjacent to the outer bearing ring 12 with so narrow a clearance that the oil chamber is a self-sealed space. However, depending on the closeness of this fit, the pressure of the oil supply, the available flow of the oil supply and the importance or otherwise of the oil leakage from the oil chamber 14, oil may be allowed to leak out of the oil chamber 14.

For example, the oil chamber housing 15 may comprise at least one hole 18 for supplying oil from the oil chamber 14 to the rolling-elements 13. Depending on the environment in which the rolling-element bearing 10 is used, some leakage from the oil chamber 14 may be beneficial in that the leakage would be directly over the adjacent rolling-elements 13. Therefore, the leakage could act to lubricate and/or cool the adjacent rolling-elements 13.

The oil chamber 14 may be equipped with holes near the base of the oil chamber 14 to feed oil to the inside surface of the roller cage 17 that accommodates the rolling-elements 13. Oil may be supplied such that an oil film is provided to the inside surface of the roller cage 17. The oil film may have a thickness in the region of from about 0.1 μm to about 1 μm. Accordingly, the oil chamber 14 may contribute to the lubrication system for the rolling-element bearing 10.

The rolling-element bearing 10 may comprise oil supply features for lubrication and sometimes for cooling. The oil supply features may be integral to the rolling-element bearing 10, or may be supplied externally by, for example, an oil jet. The oil chamber 14 may be supplied with oil from the same oil supply that is used to supply oil for lubrication and possibly cooling. Hence, no extra oil supply may be required to be provided for the oil chamber 14. Alternatively, a separate oil supply specific for use with the oil chamber 14 may be provided either integrally with the rolling-element bearing 10 or externally.

The oil chamber housing 15 may comprise a set of seals 151 around the periphery of the oil chamber housing 15. The seals 151 may not be necessary depending on the closeness of the fit between the oil chamber housing 15 and the outer bearing ring 12. The seals 151 are provided between the main body of the oil chamber housing 15 and the outer bearing ring 12. The seals 151 help to seal the oil chamber 14 such that the oil chamber 14 may form a substantially self-sealed space.

The seals 151 may be carbon seals. The seals 151 may be activated by a wavy spring. Other types of seals and forms of activation are possible. Carbon seals activated by a wavy spring are particularly suitable if the rolling-element bearing 10 is to be used in an environment in which the rotating bearing ring (e.g. the outer bearing ring 12) rotates at a relatively high speed relative to the non-rotating bearing ring (e.g. the inner bearing ring 11).

The edges of the seals 151 may be chamfered from the inside out. This may help to achieve an element of pressure balancing which can help to reduce the load on the inner surface of the outer bearing ring 12. By reducing the load on the inner surface of the outer bearing ring 12, the friction and wear rate may also be reduced.

The depth and extent of the seals 151 of the oil chamber 14 may not be particularly important. However, they should be chosen such that the oil within the oil chamber 14 acts hydrostatically as opposed to hydrodynamically on the inner surface of the outer bearing ring 12.

Any rolling-element bearing 10 having an axial space between rows 131, 132 of rolling elements 13 may be provided with the oil chamber 14 so as to off-load an externally applied load in a direction opposite to the load direction X. This can reduce the load acting on the rolling elements 13. In turn, this can increase the lifetime of the rolling-element bearing 10. A source of fluid, e.g. a high pressure source of oil, provides fluid such as oil to the oil chamber 14. A high pressure source of oil is often available as part of a bearing lubrication system. The oil chamber 14 can make use of this bearing lubrication system.

The rolling-element bearing 10 may comprise a plurality of oil chambers 14 spaced from each other in the axial direction. Any number of oil chambers 14 can be added along the axis of the rolling-element bearing. For example, if the rolling-element bearing 10 depicted in the Figures were lengthened axially each end of the rows 131, 132 of rolling elements 13, then an additional two oil chambers 14 may be added. Hence, the rolling-element bearing 10 may comprise three oil chambers 14 spaced from each other in the axial direction. One of the oil chambers 14 is positioned axially between the two rows 131, 132 of rolling-elements 13. The two rows 131, 132 of rolling elements 13 are each positioned axially between two oil chambers 14. By providing additional oil chambers 14, the pressure applied to the inner surface of the outer bearing ring 12 may be increased, without increasing the pressure of oil supplied to the oil chamber 14. Accordingly, a higher off-load can be achieved.

The axially-spaced oil chambers 14 may extend circumferentially between the inner bearing ring 11 and the outer bearing ring 12 over the same arc subtending the same angle θ. Accordingly, the oil pressure supplied by each oil chamber 14 on the outer bearing ring 12 add together, all opposing the applied load in the direction opposite to the load direction X.

Figure 9:
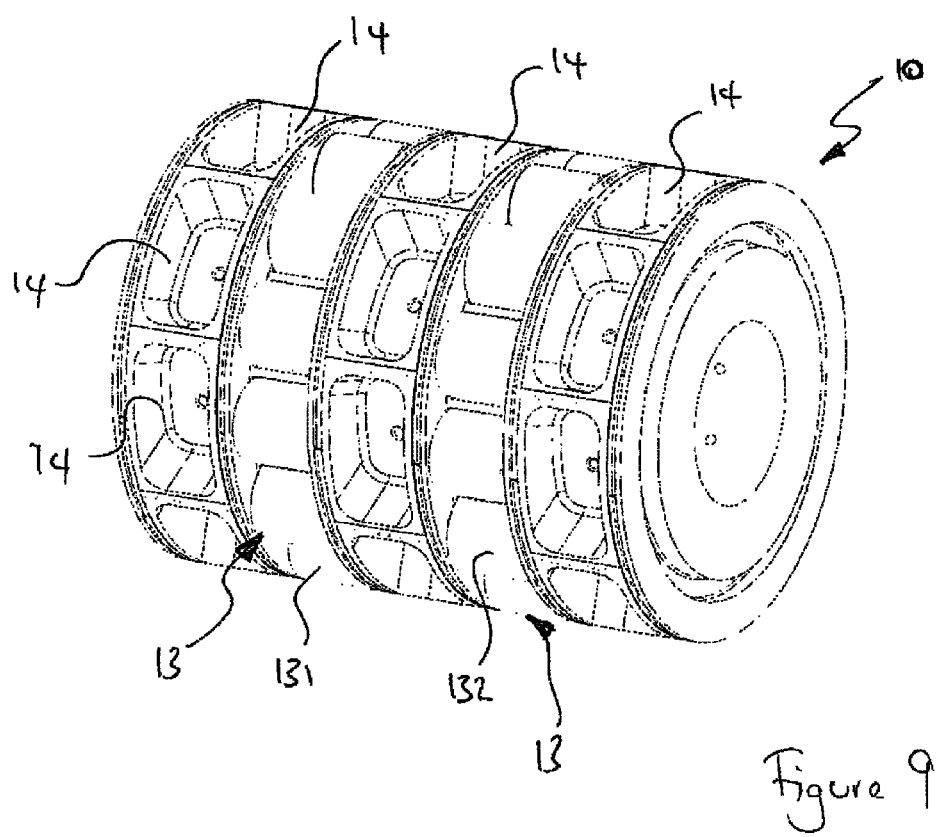
FIG. 9 shows a rolling element bearing having axially separated oil chambers.

As shown in FIG. 9, the rolling-element bearing 10 may comprise two axially spaced rows 131, 132 of rolling elements 13 and three axially spaced sets of oil chambers 14. One of the sets of oil chambers 14 may be axially between the two rows 131, 132 of rolling elements. Each row 131, 132 of rolling elements 13 may be axially between two of the sets of oil chambers 14.

As also shown in FIG. 9, the rolling-element bearing 10 may comprise a plurality of oil chambers 14 that extend circumferentially between the inner bearing ring 11 and the outer bearing ring 12 over non-overlapping arcs. Multiple oil chambers 14 may be incorporated around all or some of the circumference of the rolling-element bearing 10. The oil supply to these oil chambers 14 may be modulated such that the active oil chambers 14 act in the direction opposite to the load direction X as shown in FIG. 4. This can be useful for example where the applied external load does not always act in the same radial direction.

in another example, a set of three oil chambers 14 may be provided in the same axial position. The three oil chambers 14 extend circumferentially over non-overlapping arcs. For example, each oil chamber 14 within the set may extend over an arc subtending about 120°, or just less than 120°. Depending on the direction of the applied load, oil can be supplied to one of the set of three oil chambers 14 so as to counter the applied load.

The rolling-element bearing 10 may be comprised in a mechanism, for example a mechanism of a device such as a fan. The mechanism may comprise a load applying component 120 (e.g. a gear shown in FIG. 10) that applies a load on the rolling-element bearing 10 in the load direction X. The load direction X may be radial with respect to the rolling-element bearing 10.

The oil chamber 14 is positioned between the applied load and the inner bearing ring 11 to which the oil chamber housing 15 is fixed. Oil supplied to the oil chamber 14 acts on the outer bearing ring 12 so as to oppose the applied load. The mechanism, or the rolling-element bearing 10 itself, may comprise an oil supply system configured to supply oil through the ducts 16 to the corresponding oil chamber 14.

The mechanism, or the rolling-element bearing 10 itself, may be arranged such that the supply of oil to at least one of the oil chambers 14 is controllable independently from the supply of oil to at least one other of the oil chambers 14.

As mentioned above, this can be useful in the instance where the applied external load does not always act in the same direction.

In the construction shown in the Figures, the oil chamber housing 15 is fixed to the inner bearing ring 11. However, the oil chamber housing 15 may alternatively be fixed to the outer bearing ring 12.

While aspects of the disclosure relate to providing a rolling-element bearing 10 comprising rollers as the rolling elements 13, it will be appreciated that the rolling elements 13 could be balls. Where the disclosure relates to the exemplary arrangements/methods described above, many equivalent modifications and variations will be apparent to those skilled in the art when given this disclosure. Accordingly, the exemplary arrangements/methods set fourth above are considered to be illustrative and not limiting. Various changes to the described arrangements/methods may be made without departing from the scope of the invention.

Where reference is made herein to a mechanical device such as a fan, it will be appreciated that the rolling-element bearing 10 may be used in any type of mechanical device, including, but not limited to, an electrical appliance and a gear box. Aspects of the disclosure may be applicable, for example, to any mechanical device comprising a rolling-element bearing, such as a gas turbine engine 100 as shown in FIG. 10. The gas turbine engine 100 may include, the rolling-element bearing 10, the rotating object 110, and the load applying component 120. The rotating object 110 may be integral with, or in an interference fit with, the bearing ring 11 of the rolling-element bearing 10 to which the oil chamber 14 is not fixed. The load applying component 120 may apply a load on the rolling-element bearing 10 in a load direction (X), which is radial with respect to the rolling-element bearing 10. Any feature described and/or claimed herein may be combined with any other compatible feature described in relation to the same or another embodiment.

The invention claimed is:

1. A rolling-element bearing comprising:
   an inner bearing ring and an outer bearing ring defining an axial direction and a circumferential direction;
   a plurality of rolling elements configured to roll circumferentially between the inner bearing ring and the outer bearing ring;
   at least one oil chamber between the inner bearing ring and the outer bearing ring, each oil chamber being defined by the inner bearing ring, the outer bearing ring and an oil chamber housing fixed to one of the inner bearing ring and the outer bearing ring, the oil chamber housing including side walls extending radially and separating the oil chamber housing from the plurality of rolling elements; and
   at least one duct connected to each oil chamber for a supply of oil to the connected oil chamber, such that oil supplied to the oil chamber acts on the bearing ring to which the oil chamber housing is not fixed so as to oppose an applied load; and
   wherein each oil chamber extends circumferentially between the inner bearing ring and the outer bearing ring over an arc subtending an angel of less than 180°.

2. The rolling-element bearing of claim 1, wherein the at least one oil chamber is spaced from or adjacent to the rolling elements in the axial direction.

3. The rolling-element bearing of claim 1, comprising two axially spaced rows of rolling elements, wherein each oil chamber is axially between the two rows of rolling elements.

4. The rolling-element bearing of claim 1, wherein the angle is at least 110°.

5. The rolling-element bearing of claim 1, wherein the oil chamber housing is accommodated adjacent to the bearing ring to which it is not fixed with a clearance there between being such that the oil chamber is a self-sealed space.

6. The rolling-element bearing of claim 1, wherein the oil chamber housing comprises at least one hole for supplying oil from the oil chamber to the rolling elements.

7. The rolling-element bearing of claim 1, comprising a plurality of oil chambers spaced from each other in the axial direction.

8. The rolling-element bearing of claim 7, wherein the plurality of axially spaced oil chambers extend circumferentially between the inner bearing ring and the outer bearing ring over the same arc subtending the same angle.

9. The rolling-element bearing of claim 7, comprising two axially spaced rows of rolling elements and three axially spaced sets of oil chambers, wherein one of the sets of oil chambers is axially between the two rows of rolling elements and each row of rolling elements is axially between two of the sets of oil chambers.

10. The rolling-element bearing of claim 1, comprising a plurality of oil chambers that extend circumferentially between the inner bearing ring and the outer bearing ring over non-overlapping arcs.

11. A gas turbine engine comprising:
a rolling-element bearing comprising:
an inner bearing ring and an outer bearing ring defining an axial direction and a circumferential direction;
a plurality of rolling elements configured to roll circumferentially between the inner bearing ring and the outer bearing ring;
at least one oil chamber between the inner bearing ring and the outer bearing ring, each oil chamber being defined by the inner bearing ring, the outer bearing ring and an oil chamber housing fixed to one of the inner bearing ring and the outer bearing ring, the oil chamber housing including side walls extending radially and separating the oil chamber housing from the plurality of rolling elements; and
at least one duct connected to each oil chamber for a supply of oil to the connected oil chamber; and further comprising:
a rotating object integral with, or in an interference fit with, the bearing ring to which the at least one oil chamber is not fixed; and
a load applying component that applies a load on the rolling-element bearing in a load direction (X), which is radial with respect to the rolling-element bearing, wherein at least one oil chamber is between the applied load and the bearing ring to which the corresponding oil chamber housing is fixed, such that oil supplied to the at least one oil chamber acts on the bearing ring to which the oil chamber housing is not fixed so as to oppose the applied load; and
wherein each oil chamber extends circumferentially between the inner bearing ring and the outer bearing ring over an arc subtending an angel of less than 180°.

12. The gas turbine engine of claim 11, comprising an oil supply system configured to supply oil through the at least one duct to the connected oil chamber.

13. The gas turbine engine of claim 12, wherein the rolling-element bearing includes a second oil chamber and the roller-element bearing is arranged such that the supply of oil to the at least one oil chamber is controllable independently from the supply of oil to the second oil chamber.

14. A method of countering a load applied to a rolling-element bearing that comprises:
an inner bearing ring and an outer bearing ring defining an axial direction and a circumferential direction;
a plurality of rolling elements configured to roll circumferentially between the inner bearing ring and the outer bearing ring;
at least one oil chamber between the inner bearing ring and the outer bearing ring, each oil chamber being defined by the inner bearing ring, the outer bearing ring and an oil chamber housing fixed to one of the inner bearing ring and the outer bearing ring, the oil chamber housing including side walls extending radially and separating the oil chamber housing from the plurality of rolling elements; and
at least one duct corresponding to each oil chamber for a supply of oil to the corresponding oil chamber;
wherein the method comprises supplying oil to the at least one oil chamber, such that oil supplied to the at least one oil chamber acts on the bearing ring to which the oil chamber is not fixed so as to oppose the applied load; and
wherein each oil chamber extends circumferentially between the inner bearing ring and the outer bearing ring over an arc subtending an angel of less than 180°.

* * * * *